US006708156B1

(12) United States Patent
Gonten

(10) Patent No.: US 6,708,156 B1
(45) Date of Patent: Mar. 16, 2004

(54) SYSTEM AND METHOD FOR PROJECTING MARKET PENETRATION

(75) Inventor: Michael Von Gonten, Minnetonka, MN (US)

(73) Assignee: Michael von Gonten, Inc.

( * ) Notice: Subject to any disclaimer, the term of this patent is extended or adjusted under 35 U.S.C. 154(b) by 0 days.

(21) Appl. No.: 09/550,574

(22) Filed: Apr. 17, 2000

(51) Int. Cl.$^7$ ............................................... G06F 17/60
(52) U.S. Cl. ........................................... 705/10; 705/7
(58) Field of Search ........................................ 705/10

(56) References Cited

U.S. PATENT DOCUMENTS

| | | | | |
|---|---|---|---|---|
| 5,299,115 A | * | 3/1994 | Fields et al. | 705/10 |
| 5,375,201 A | * | 12/1994 | Davoust | 715/503 |
| 5,377,095 A | * | 12/1994 | Maeda et al. | 705/10 |
| 5,459,656 A | * | 10/1995 | Fields et al. | 700/104 |
| 5,461,699 A | * | 10/1995 | Arbabi et al. | 706/21 |
| 5,615,109 A | * | 3/1997 | Eder | 705/8 |
| 5,712,985 A | * | 1/1998 | Lee et al. | 705/7 |
| 6,029,139 A | * | 2/2000 | Cunningham et al. | 705/10 |
| 6,032,125 A | * | 2/2000 | Ando | 705/10 |
| 6,078,893 A | * | 6/2000 | Ouimet et al. | 705/1 |
| 6,321,205 B1 | * | 11/2001 | Eder | 705/40 |
| 6,366,890 B1 | * | 4/2002 | Usrey | 705/10 |
| 6,401,070 B1 | * | 6/2002 | McManus et al. | 705/1 |

FOREIGN PATENT DOCUMENTS

| | | | | |
|---|---|---|---|---|
| JP | 410143490 A | * | 5/1998 | G06F/17/00 |
| JP | 10307808 A | * | 11/1998 | G06F/17/00 |

OTHER PUBLICATIONS von Gonten et al., "Advertising exposure and advertising effects: New Panel–based findings", Journal of Advertising Research, Jul./Aug. 1997 [retrieved on Aug. 21, 2002], vol. 37, Issue 4, 10 pages, Retrieved from: Proquest Direct.*

Donius, James F, "Market Tracking: a strategic reassessment and planning tool", Journal of Advertising Research, Feb./Mar. 1985 [retrieved on Aug. 15, 2002], vol. 25, Issue 1, 1 pages, Retrieved from: Dialog.*

Donius, James F, "Market Tracking: A strategic reassessment and planning tool", Journal of Advertising Research, Feb./Mar. 1985 [retrieved on Aug. 15, 2002], vol. 25, Issue 1, 1 page, Retrieved from: Dialog.*

Donius, James F, "Campaign Simulation via Multiple Exposure", Journal of Advertising Research, Apr./May 1983 [retrieved on Aug. 15, 2002]vol. 23, Issue 2, 1 page, Retrieved from: Dialog.*

Longman, Kenneth A., "If not effective frequency, then what?", Journel of Advertising Research, Jul./Aug. 1997 [retrieved on Aug. 2, 2002], vol. 37, Issue 4, 8 pages, Retrieved from: Proquest Direct.*

Howard, John A., "Buyer Behavior in Marketing Strategy", Prentice Hall, 1994, 2$^{nd}$ Edition, pp. 41–48 and 365–382.*

(List continued on next page.)

*Primary Examiner*—Tariq R. Hafiz
*Assistant Examiner*—Beth Van Doren
(74) *Attorney, Agent, or Firm*—E. J. Brooks & Associates, PLLC

(57) ABSTRACT

A system for facilitating simulations and modelling of market sales volume is provided including a server, an input device, at least one web pages, and software for projecting penetration of merchandise at a predetermined number of weeks, W, since a launch of a product, based on weekly data of initial purchases from a launch of a product. The software can also be operable for generating a curve from weekly sales data. The software can also be operable for retrieving a component of the curve (B) representing a degree of belly of the curve, retrieving a component from the curve representing a slope term (S) and performing a calculation to produce a predicted or continued value for components of market sales volume using the B component and the slope component (S) in a formula, wherein the formula is:

Predicted=$Exp(S) \times W^{(B)}$.

46 Claims, 7 Drawing Sheets

Penetration Buying Occasions

Predicted = Exp(6.995) * Weeks ^-.525

(Average weekly miss for "Base Period" = 35.5 Households out of 167,110 Households, or 2/100 of one percent (.0002))

OTHER PUBLICATIONS

Walker et al., "Why liking matters.", Journal of Advertising, May–Jun./1994 [retrieved Aug. 15, 2002], vol. 34, No. 3, 13 pages retrieved from: Dialog, file 148.*

Forst, Frank G., "Forecasting Restaurant Sales Using Multiple Regression and Box–Jenkins Analysis", Journal of Applied Business Research, Spring 1992 [retrieved–Aug. 15, 2002], vol. 8, No. 2, 4 pages, retrieved from: Dialog., 15.*

"Marketplace Worldwide", www.moonhoney.com, [retrieved Aug. 2, 2002], 3 pages, Retrieved from: Google.com.*

Ephron et al., "Media Scheduling and Carry–over effects", www.ephrononmedia.com, Jul./Aug. 2002 [retrieved on Jan. 31, 2003], 10 pages, retrieved from: Goggle.com.*

Morrison, Jeffrey S., "Life–cycle approach to new product forecasting", The Journal of Business Forecasting Methods and Systems, Summer 1995 [retrieved Aug. 27, 2002], vol. 14, Issue 2, 3 pages, Retrieved from: Proquest.*

Mahajan et al., "When is it worthwhile targeting the majority instead of the innovators in a new product launch", JMR, Nov. 1998 [retrieved Aug. 27, 2002–Jan. 31, 2003], vol. 35, Issue 4, 20 pages, retrieved from: Proquest Direct.*

Ephron, E., "More Weeks, Less Weight: The Shelf–Space Model of Adverting", *Journal of Advertising Research, 35* (*3*), pp. 18–23, (1995).

Jones, J.P., *When Ads Work : New Proof that Advertising Triggers Sales*, Lexington Books, A Division of Simon & Schuster Inc., New York, NY, pp. 1–240, (1995).

McDonald, C., *Advertising Reach and Frequency : Maximizing Advertising Results Through Effective Frequency, Second Edition*, NTC Business Books, a division of NTC Publishing Group, Lincolnwood, Illinois, pp. 1–157, (1996).

Naples, M.J., *Effective Frequency: The Relationship Between Frequency and Advertising Effectiveness*, Association of National Advertisers, New York, NY, pp. 1–140, (1979).

von Gonten, M.F., et al., "Advertising Exposure and Advertising Effects: New Panel–based Findings", *Journal of Advertising Research, 37* (*4*), pp. 51–60, (1997).

* cited by examiner

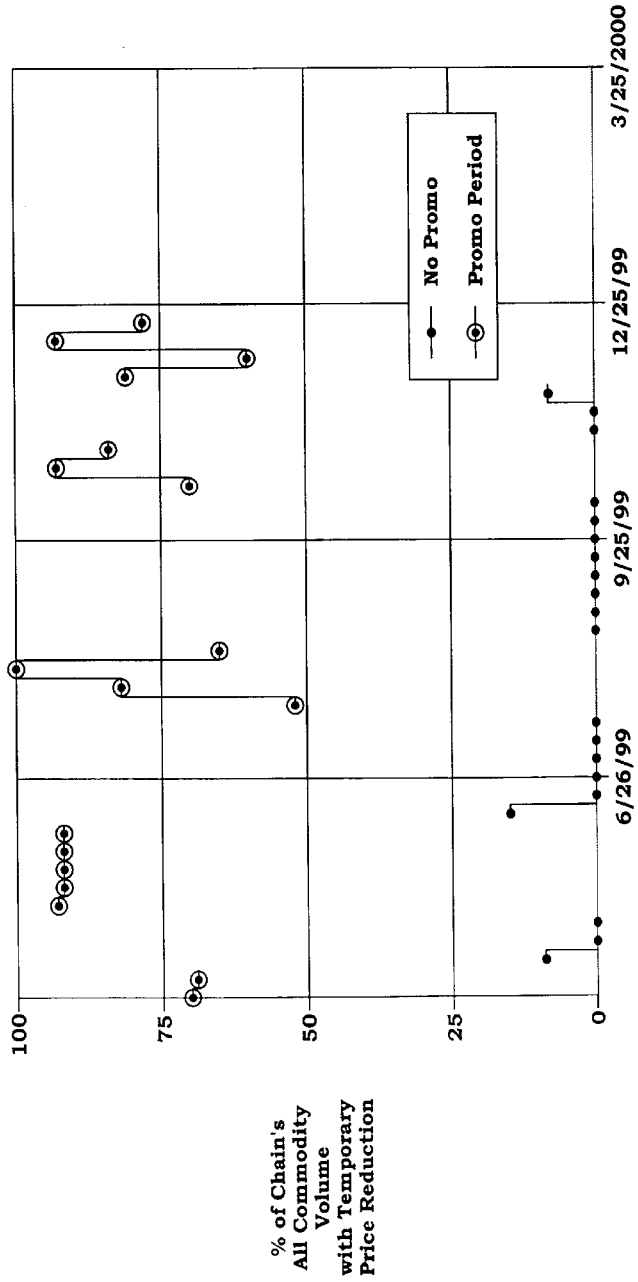

FIGURE 4

In-Store Conditions

- All of the stores providing data were from one chain, and the practice of that chain was to promote by offering temporary price reductions (TPR)
- The chart above shows an objective measure of the level of TPR activity, measured in % of All Commodity Volume, a measure which weights large and small stores by the volume of all goods sold.
- Weeks designated by a (⊙) were counted as promotion weeks (Promo Period), weeks designated by a (•) were counted as non-promotional weeks.

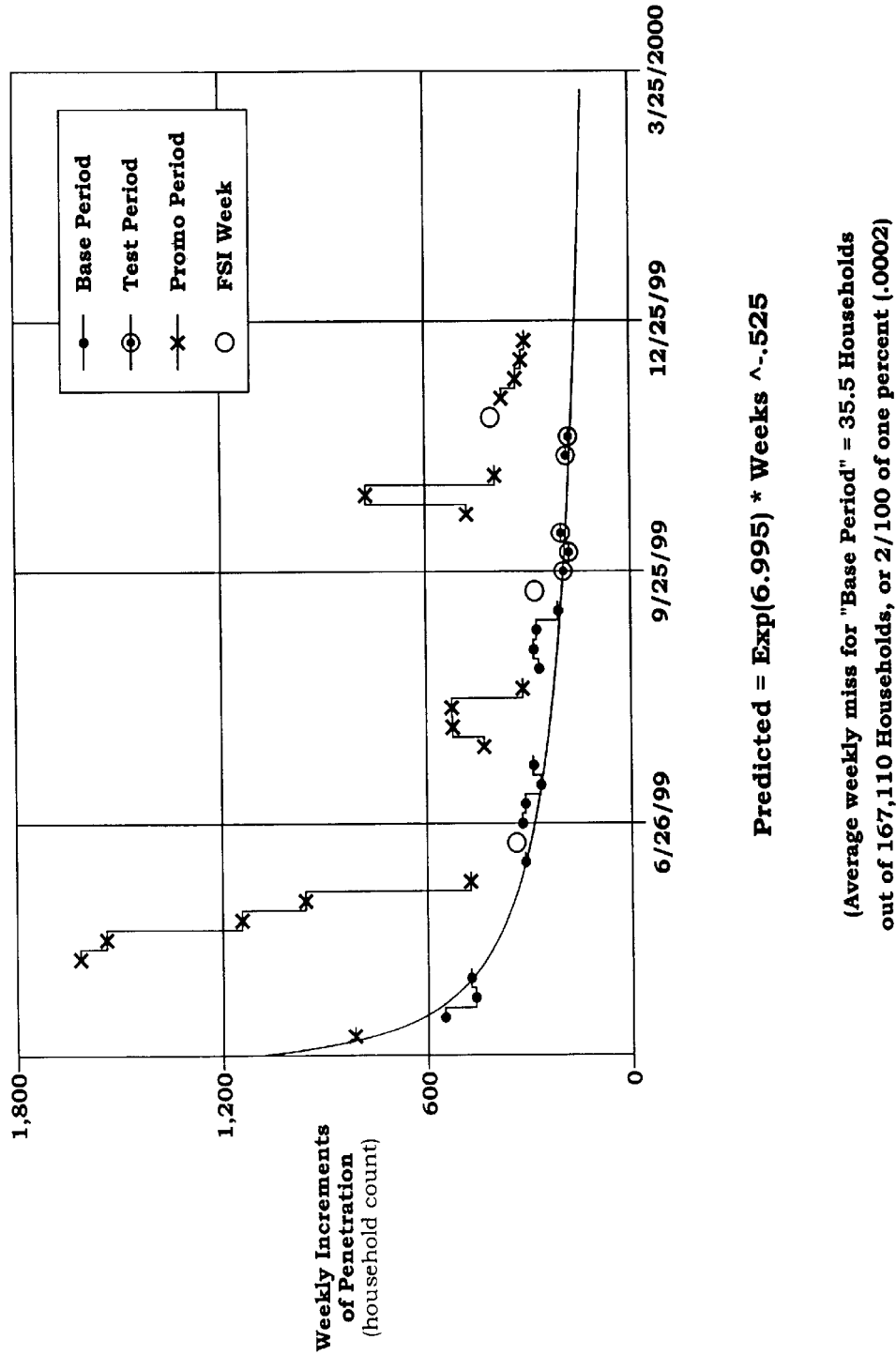

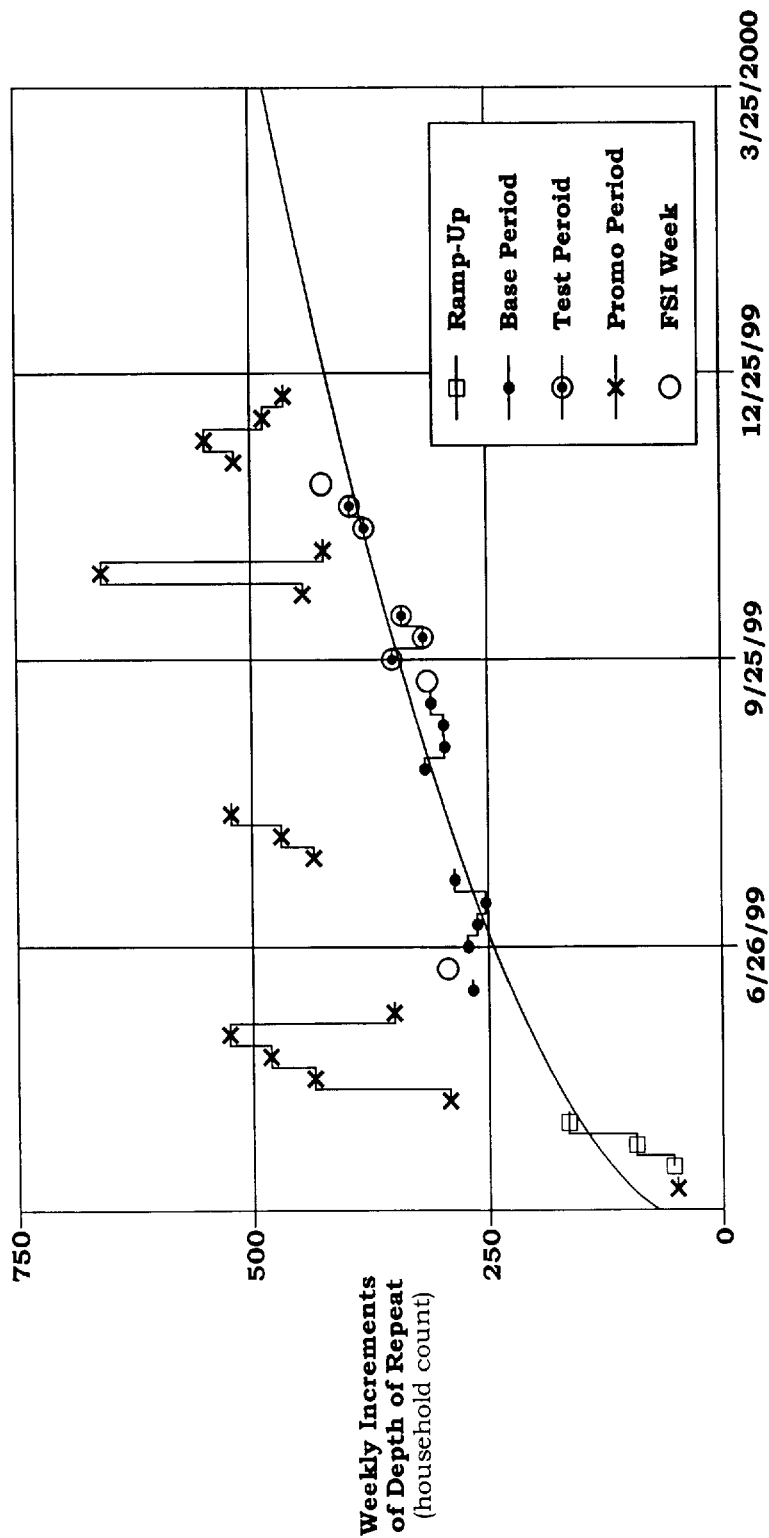

SYSTEM AND METHOD FOR PROJECTING MARKET PENETRATION

FIELD OF THE INVENTION

The present invention relates generally to the field of economics. More particularly, the present invention relates to a system and a method for predicting and projecting market penetration and evaluating advertising and promotional impact.

BACKGROUND

For more than twenty years, the planning and buying of television advertising has been based on the concept of effective frequency. A compilation of research is provided in *Effective Frequency: The Relationship Between Frequency and Advertising Effectiveness*, by Mike Naples (1979) recently updated by Colin McDonald (1996). A key concept set forth in the book is that a single exposure is not enough to create a desired sales effect; most media planning models assume an effective frequency of three. In part based on this concept, a majority of television media plans are "flighted", that is, weeks of dense exposure are followed by weeks off-air. Off-air weeks are necessitated by the cost of acquiring enough air time to provide for an effective frequency of three at whatever level of reach is desired. The belief in effective frequency causes advertisers to plan to be off-air rather than expose their advertising at frequency levels below the targeted three.

Over the last several years a number of publications have changed the perception of effective frequency. The works of John Philip Jones, particularly When Ads Work (1995), are seminal to the changes taking place in the concept of effective frequency. Using single-source data and a share-based analytical scheme, Jones has examined purchases within one week of ad exposure, finding that a single exposure within that time period produces the majority of the positive share effect. While additional exposures beyond the first produce small gains, Jones concludes that effective frequency is in fact one, and that continuity of airing, rather than flighting, should be the advertiser's goal.

Expanding on the work of Jones, Ephron (1995) draws media conclusions that (weekly) reach should be the planning and buying criteria, that being off-air, as required by the flighting pattern, is equivalent to being out-of-stock at the point of sale. Ephron uses a concept of recency to explain the manner in which a single exposure of advertising works. He postulates a pool of "this week's buyers" which may be affected by the advertising which airs this week, plus a pool of "next week's buyers" which may be affected by next week's airings, but which are unaffected by this week's advertising exposures, and so on forward in time. Thus continuity of exposure is rewarded, and off-air weeks (which result from flighting to gain frequency of exposure greater than one on the air), penalize a brand.

These publications illustrate that the study of advertising marketing effects on products' sales performance is an important area of study and concern for product manufacturers. First time buyers due to advertising are likely to be repeat buyers.

FIG. 4 provides an example of a study of advertising activity. Referring to FIG. 4, a chart titled IN STORE CONDITIONS is shown. The chart above shows an objective measure of the level of temporary price reduction (TPR) activity, measured in percent % of All Commodity Volume, a measure which weights large and small stores by the volume of all goods sold. Weeks designated by a bulls eye were counted as promotion weeks (Prom. Period). Weeks designated by a bullet were counted as non-promotional weeks.

Unfortunately, to get a true evaluation of the effectiveness of any advertising campaign a baseline must be known which represents what the expected for a particular product would have been absent the advertising promotion. To attempt to model the same, companies/manufacturers look to numerous consumer polling groups for information in order to approximate what the expected value of these data points would be, e.g to understand the effectiveness of an advertising campaign.

For example, AC Nielsen, Inc., and Information Resources, Inc. (IRI) work in the area of modeling advertising effects. Media Marketing Assessment (MMA), Hudson River Group and Millward/Brown also work in this area. These entities utilize aggregate data plugged into extremely complex equations having forty to fifty parameters. Perhaps seventy to eighty estimates are made to aggregate back to the national estimate cumulating data. From this sort of convoluted data manipulation, these groups offer their analyses.

Bases, which is presently a division AC Nielsen, Inc., provides forecasting, or market sales volume simulation, for new products. The Bases processes, however, are anchored in a 52 week market, and cannot provide information prior to or beyond the 52 week expected picture or prediction.

AC Nielsen and IRI have modeling groups and.access to raw data, and still do not make use of it. These and other modelers of consumer data use aggregate data instead with extremely complex equations having 40–50 parameters. They work with data at the level of a marketing chain. They require 70–80 estimates to aggregate back to national estimate cumulating data. The less that data is, or must be, manipulated the more accurate in character that data. Less manipulated data would be more useful and accurate in providing evaluations, forecasts or expected future performance of a product.

Prior art methods have about fifty parameters to estimate and require regression based adjustments to individual data points as large as a data point. These, conventional modeling methods do not isolate week by week data within a given class of products and thus are not able to provide a true week by week analysis, but instead provide only a more generalized picture at 52 weeks.

For the reasons stated above, and for other reasons stated below which will become apparent to those skilled in the art upon reading and understanding the present specification, it is desirable to develop systems and methods which can afford greater flexibility in analyzing advertising effects and more timely forecasting and analysis of advertising exposure and expected future performance for product sales, in a manner which minimizes the manipulation of data and provides greater accuracy.

SUMMARY OF THE INVENTION

The above mentioned problems associated with modeling and analysis of advertising effects and other problems are addressed by the present invention and will be understood by reading and studying the following specification. Systems and methods are described which afford organizations greater flexibility and accuracy in analyzing effects of their current advertising and better forecasting and implementation of proposed strategies and advertising changes.

The present invention in one embodiment is a modeling process which can be used to isolate and document marketing and advertising effects of any kind, including effects of a short-term or long-term nature. The process may also be used to monitor or forecast advertising effects. In addition, the process may be used to simulate a test market for a product. According to the teachings of the present invention, the modeling process uses household panel data. The present invention provides a method for predicting expected sales volume. The three components of market sales volume, market penetration, first repeat and depth of repeat are predicted according to the present invention based on data such as consumer response data from a simulated test market. In one embodiment, these factors are predicted according to the following formula:

$$\text{Predicted} = \text{Exp}(S) \times W^B.$$

The same equation is used for estimating all three components of volume, e.g. penetration (the initial purchase), first repeat (the second purchase) and depth of repeat (the third or higher purchase). According to the teachings of the present invention, the modeling process includes determining a slope term from a set of collected consumer panel data. The equation includes three parameters. The first is the slope term (S), which is solved from the data. The second term, W, is an objective count of the number of weeks elapsed since the start of the data string. The third term is the degree of belly in the curve (B), which modifies W to a specific power. This modifier, B, is treated as a constant. For each component of volume, the constant B will be different. B, however, is approximately constant within a given brand or class of products to be analyzed.

In one embodiment, the present invention provides a computer readable medium having computer executable instructions to cause a computer to perform a method for projecting market penetration of merchandise at a predetermined number of weeks since product launch, based on a history of sales from product launch. The method includes retrieving a component of a curve representing B. The method further includes retrieving a component from the curve representing the slope term S. The method includes performing a calculation to produced a predicted or continued value for market penetration using the B component and the slope component in a defined formula, wherein the formula is:

$$\text{Predicted} = \text{Exp}(S) \times W^B.$$

A system for facilitating modeling of market sales volume is provided including a server including a database having a number of client files, wherein each client file is an organized client data file including a number of linked web pages which are downloadable and displayable to a client program at a remote client having a graphical user interface. The system further includes an input device coupled to the remote client and on-line to the server. The system includes at least one web page including a data field for entering a parameter for an analysis of a client file and software means operable on the server and the client program at the remote client for performing a method of projecting market sales volume of merchandise at a predetermined number of weeks, W, since a launch of a product, based on weekly data of initial purchases from a launch of a product. The software means is operable on the server and the remote client for generating a curve from weekly sales data wherein the curve plots a set of weekly sales data versus number of weeks from the launch of the product. The software means is operable on the server and the remote client for retrieving a component of the curve (B) representing a degree of belly of the curve, retrieving a component from the curve representing a slope term (S) and performing a calculation for a predicted or continued market sales volume using the B component and the slope component in a formula, wherein the formula is:

$$\text{Predicted} = \text{Exp}(S) \times W^B.$$

The systems and methods of the present invention are operable for simulating a value for market penetration, first repeat and depth of repeat for a new product launch using the same formula method.

Prior art methods have about fifty parameters to estimate and require regression based adjustments to individual data points as large as a data point to perform such simulations. The present systems and methods remove the necessity of adjustment. The less adjusted data used in the systems and methods of the present invention provide more accurate simulations. The absence of adjustment is beneficial to the quality of the data. The present model does not adjust or damage data. It utilizes raw data with fewer simpler parameters. The data are therefore more robust.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

FIG. 4 is a chart representing market sales volume and showing advertising effects for the same for In Store Conditions according to the teachings of the prior art.

FIG. 5 is a curve representing projected market penetration according to the teachings of the present invention.

FIG. 7 is a curve representing predicted and projected depth of repeat according one embodiment of the present invention.

DETAILED DESCRIPTION

In the following detailed description, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
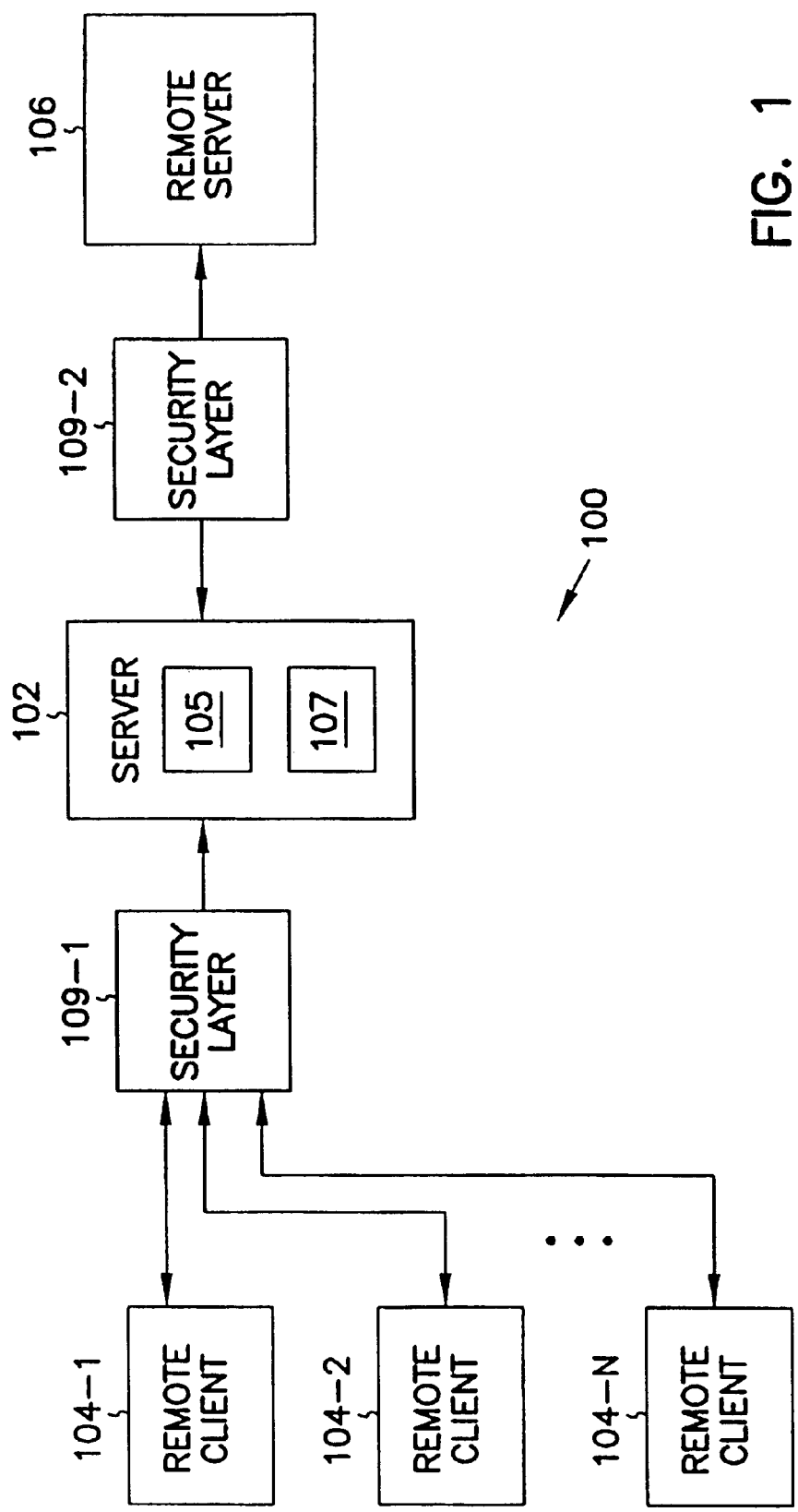
FIG. 1 is an illustration of a system according to the teachings of the present invention.

FIG. 1 is an illustration of a system 100 according to the teachings of the present invention. In one embodiment, the system 100 includes an Internet network system 100. In FIG. 1, the system 100 includes a server 102. Server 102 includes a processor 105 coupled to a data storage device 107. The system 100 further includes one or a number of remote clients 104-1, 104-2, . . . , 104-N each including a client program, or software means, which is operatively or communicatively coupled to the server 102. In one embodiment, the number of remote clients 104-1, 104-2, . . . , 104-N are operatively coupled to the server 102 through a first security layer 109-1, or secure data network 109-1. In another embodiment, the number of remote clients 104-1, 104-2, . . . , 104-N such as particular client product manufacturers, each including a client program, or software means, include software which provide security at the number of remote clients 104-1, 104-2, . . . , 104-N. In one embodiment the number of remote clients 104-1, 104-2, . . . , 104-N are coupled to the server 102 over a local area network (LAN), e.g. an Ethernet network. In an alternative embodiment, the number of remote clients 104-1, 104-2, . . . , 104-N are coupled to the server 102 over a wide area network (WAN). Also the number of remote clients 104-1, 104-2, . . . , 104-N can be coupled to the server 102 over the public switched telephone network (PSTN) and/or the Internet. In one embodiment, by way of example and not by way of limitation, the number of remote clients 104-1, 104-2, . . . , 104-N can communicate with one another and the server 102 using transmission control protocol/Internet protocol (TCP/IP).

The system 100 can further include coupling, as described above to additional servers and systems 106, such as servers and systems 106 maintained by other organizations, or a mainframe computer. Such systems are known and understood by one of ordinary skill in the art. In one embodiment, the additional servers and systems 106 or mainframe computer include core databases accessible by the server 102. In one embodiment, the servers and systems include servers and systems maintained by third party market pooling groups such as A.C. Nielsen and MMA. For example, the additional servers and systems 106 or mainframe computer can include databases and executable instructions which operate on the file data of third party or outside organizations and/or possess PSTN processing and routing capabilities. In one embodiment, the additional servers and systems 106 include proprietary databases and data modules maintained by third party or outside organizations. In one embodiment, the additional servers and systems 106 are similarly coupled to the server 102 through a second security layer 109-2, or secure data network 109-2 such that file data from the additional servers and systems 106 can be exported to server 102. In one embodiment, the additional servers and systems 106 are coupled to the server 102 over a local area network (LAN), e.g. an Ethernet network. In an alternative embodiment, the additional servers and systems 106 are coupled to the server 102 over a wide area network (WAN). Also the additional servers and systems 106 can be coupled to the server 102 over the public switched telephone network (PSTN) and/or the Internet. In one embodiment, by way of example and not by way of limitation, the additional servers and systems 106 can communicate with one another and the server 102 using transmission control protocol/Internet protocol (TCP/IP).

The server 102 can be coupled to third party or outside organizations and the additional servers and systems 106 in a direct hardwired fashion, e.g. hybrid fiber-coax connection and/or indirectly in a wireless fashion using remote electromagnetic signal transmission in the radio or microwave frequencies.

In FIG. 1, the server 102, the number of remote clients 104-1, 104-2, . . . , 104-N, and the additional servers and systems 106 all include computer readable medium having computer-executable instructions. These computer readable medium include such devices as a disk drive for reading data storage media, e.g. a compact disc, and/or computer readable medium such as random access memory (RAM) and-read only memory (ROM). Similarly, the server 102, the number of remote clients 104-1, 104-2, . . . , 104-N, and the additional servers and systems 106 can all include a processor coupled to a data storage device.

Figure 2:
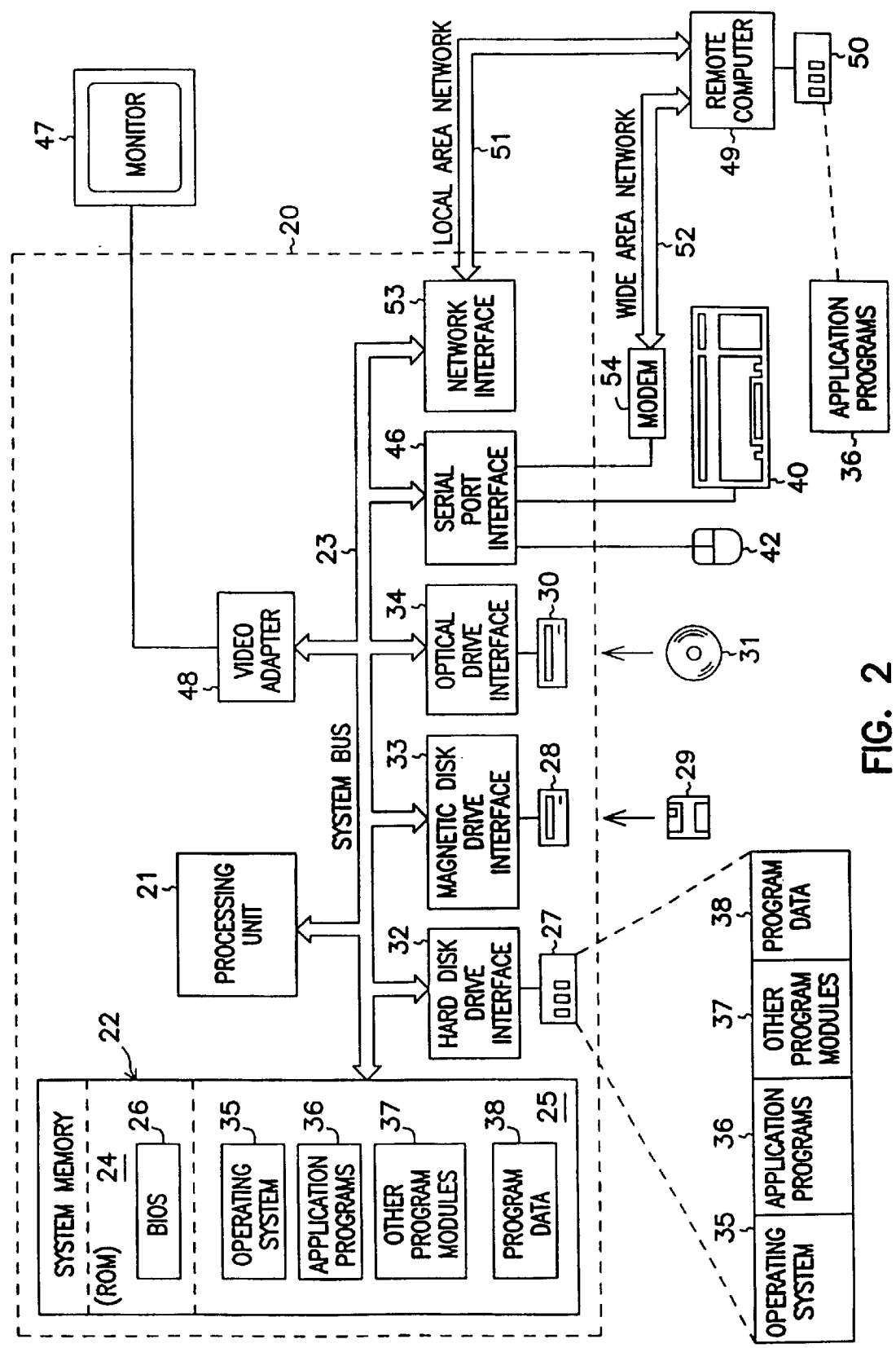
FIG. 2 is a diagram of a hardware and operating environment in conjunction with which embodiments of the invention may be practiced.

FIG. 2 is a diagram of a hardware and operating environment in conjunction with which embodiments of the invention may be practiced for the server 102, the number of remote clients 104-1, 104-2, . . . , 104-N, and the additional servers and systems 106 from FIG. 1. The description of FIG. 2 is intended to provide a brief, general description of suitable computer hardware and a suitable computing environment in conjunction with which the invention may be implemented. The invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multi processor systems, microprocessor-based or programmable consumer electronics, network PCS, minicomputers, mainframe computers, and the like. The invention may also be practiced in distributed computer environments where tasks are performed by remote processing devices that are linked through a communications network. In a distributed computing environment, program modules may be located in both local and remote memory storage devices.

In the embodiment shown in FIG. 2, the hardware and operating environment of the server 102, the remote client 104, and/or the additional servers and systems 106 from FIG. 1 includes a general purpose computing device in the form of a personal computer 20, or a server 20, including a processing unit 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 can be any of several types of bus structures including a memory bus or memory controller, a peripheral bus, and a local bus using any of a variety of bus architectures. The system memory can also be referred to as simply the memory, and includes read only memory (ROM) 24 and random access memory (RAM) 25. A basic input/output system (BIOS) 26, containing the basic routines that help to transfer information between elements within the computer 20, or a server 20, such as during start-up, may be stored in ROM 24. The computer 20, or a server 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20, or a server 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, can be used in the exemplary operating environment.

A number of program modules can be stored on the hard disk, magnetic disk 29, optical disk 31, ROM 24, or RAM 25, including an operating system 35, one or more application programs 36, other program modules 37, and program data 38. A plug in containing a search engine for the present invention can be resident on any one or number of these computer-readable media.

A user may enter commands and information into the personal computer 20, or server 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

As explained in connection with FIG. 1, the computer 20, or server 20 may operate in a networked environment using logical connections to one or more remote computers or servers, such as remote computer 49. These logical connections are achieved by a communication device coupled to or a part of the computer 20, or server 20; the invention is not limited to a particular type of communications device. The remote computer 49 can be another computer, a server, a router, a network PC, a client, a peer device or other common network node, and typically includes many or all of the elements described above relative to the computer 20, or server 20, although only a memory storage device 50 has been illustrated in FIG. 2. The logical connections depicted in FIG. 2 include a local area network (LAN) 51 and a wide area network (WAN) 52. Such networking environments are commonplace in office networks, enterprise-wide computer networks, intranets and the Internet, which are all types of networks.

When used in a LAN-networking environment, the computer 20, or server 20, is connected to the LAN 51 through a network interface or adapter 53, which is one type of communications device. When used in a WAN-networking environment, the computer 20, or server 20, typically includes a modem 54, a type of communications device, or any other type of communications device, e.g. a wireless transceiver, for establishing communications over the wide area network 52, such as the Internet; the invention is not so limited. The modem 54, which may be internal or external, is connected to the system bus 23 via the serial port interface 46. In a networked environment, program modules depicted relative to the personal computer 20, or portions thereof, can be stored in the remote memory storage device 50 of remote computer, or server 49. It is appreciated that the network connections shown are exemplary and other means of and communications devices for establishing a communications link between the computers may be used.

The hardware and operating environment in conjunction with which embodiments of the invention may be practiced has been described. The computer 20, or server 20, in conjunction with which embodiments of the invention can be practiced can be a conventional computer, a distributed computer, or any other type of computer; the invention is not so limited. Such a computer 20, or server 20, typically includes one or more processing units as its processor, and a computer-readable medium such as a memory. The computer 20, or server 20, can also include a communications device such as a network adapter or a modem, so that it is able to communicatively couple to other computers, servers, or devices.

Figure 3:
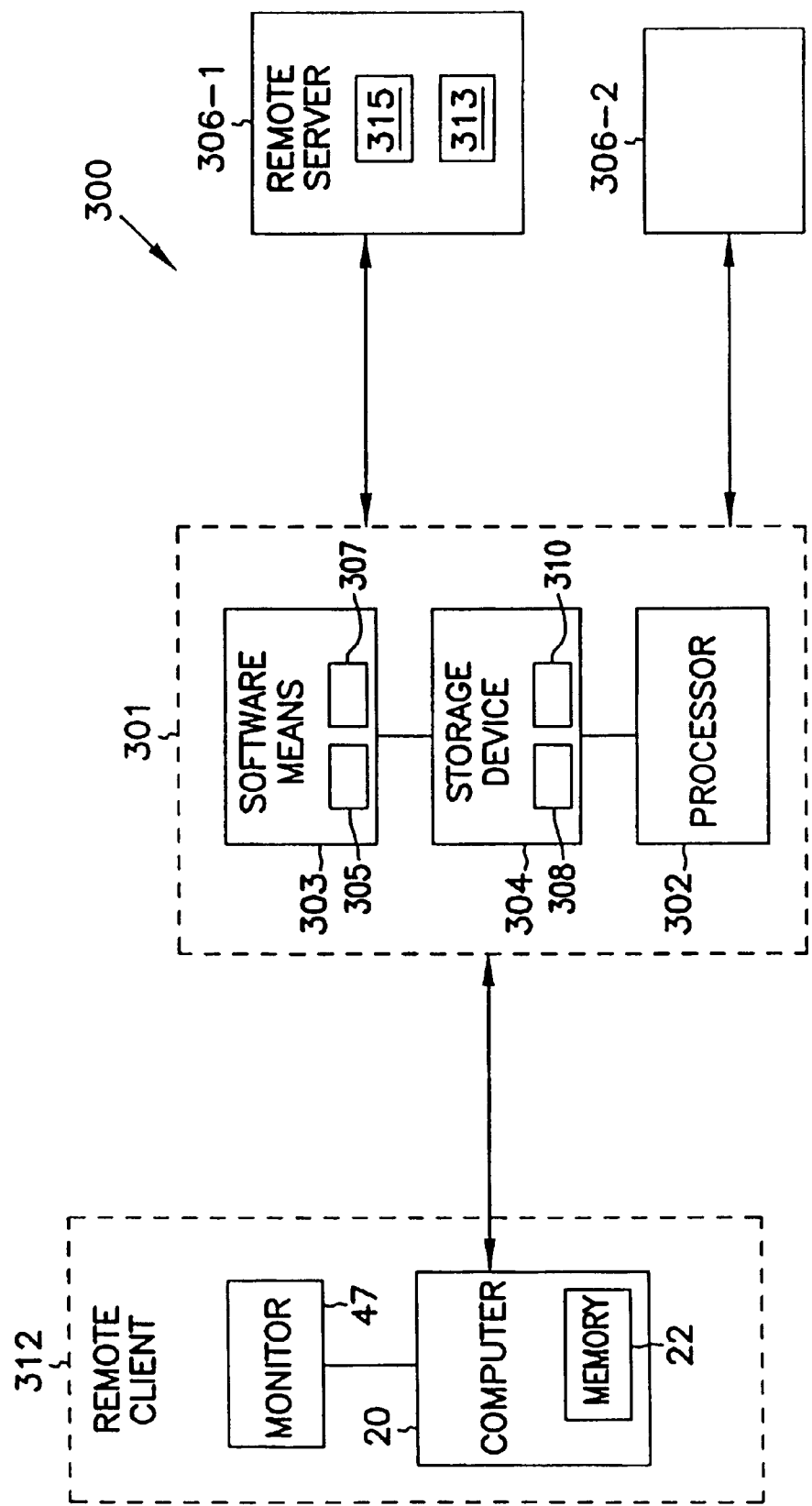
FIG. 3 is a more detailed diagram of the system of FIG. 1 according to the teachings of the present invention.

FIG. 3 is a more detailed diagram of the system 100 interaction of FIG. 1 according to the teachings of the present invention. In FIG. 3, the system 300 includes server 301. The server 301 in the system 300 includes a processor 302 coupled to a storage device 304. The system further includes software means 303 operative on the processor 302, the remote client 312 having a client program, and the additional servers and systems 306-1, 306-2, etc., to perform methods according to the teachings of the present invention. The software means 303 includes a novel software program, including interface protocols, application programs, and program modules for carrying out the methods of the present invention. According to the teachings of the present invention, the software means 303 includes an analysis module 305 suitable for retrieving market sales data from outside servers 306-1, 306-2 and performing analyses on this sales data for any of a number of client data files. Also, according to the teachings of the present invention, the software means 303 includes a filter module 307 suitable for organizing the retrieved sales data for a particular client into a customizable client data file accessible to a remote client over the Internet. According to the teachings of the present invention, the filter module 307 and the analysis module 305 contain application programs, and/or make up portions of application programs, which can be stored in the storage device. Similarly, the organized, customizable client data file can be stored in storage device 304 on server 301. The novel software means 303 according to the teachings of the present invention can be executed on system 300. The software means 303 can be resident on the server as shown in FIG. 3, or alternatively, the software means 303 can be resident on any number of the storage devices, e.g. computer readable medium, coupled in system 300. One of ordinary skill in the art will understand the manner in which software means 303 can be launched from a computer readable medium in a computer based system to execute the functions defined in the software program. One of ordinary skill in the art will further understand the various programming languages which may be employed to create a software program designed to implement and perform the methods of the present invention. In one embodiment, much of the application software is implemented using object oriented programming, hyper-text mark-up language (HTML) and the like. However, the teachings of the present invention are not limited to a system using object oriented programming and no embodiment of the invention is limited to a particular programming language or environment.

System 300 facilitates advertising effect modeling services for any number of organizational clients. Server 301 includes a database, or first database 308 having a set of resident data in various data structures, e.g. the pooled panel sales data. In one embodiment, the server includes another database, or second database 310, having a number of linked web pages 310 in the storage device which are downloadable and displayable to a client program at a remote client 312 having a graphical user interface, e.g. computer 20 and monitor 47. The web pages can be pages that are displayable and down loadable to the client, i.e. to see and save the analysis on their marketing advertising effects. In one embodiment of FIG. 3, the database 308 in server 301 includes a database of a number of client files, e.g. the organized, customizable client data files having the sales data for the particular client organized therein. The number of linked web pages 310 can be used to download and display the analysis performed according to the methods of the present invention to the remote client 312 having a graphical user interface. In one embodiment, as will be understood by one of ordinary skill in the art upon reading this disclosure, each client file can be organized by particular product classes and include a number of different or similar client data files. In one embodiment, by way of illustration and not by way of limitation, each client file is an organized system data file including panel data particular to the client and client's products. For example, in one embodiment, a client file can include an organized system data file including an advertising and a sales history of a specific product or product line for a client. Similarly, the client file can include a number of data fields particular to a given industry or organization.

In operation the analysis module 305 suitable for retrieving market sales data from outside servers 306-1, 306-2 and performing analyses on this sales data for any of a number of client data files recognizes and accounts for any optional features, e.g. such as particular components of the client's sales volume when performing analyses on the client data file. In other words, the software means 303 can address particular components in performing any simulation or analysis on a given data file.

Referring to FIG. 3, in one embodiment, the number of linked web pages 310 in the storage device 304 of server 302 includes at least one web page/website, or first web page, which displays a market sales volume curve generated in performing an analysis of a client file using the analysis module 305. Examples of these curves for one embodiment of the present invention are provided in FIGS. 5–7 and are explained in more detail below.

According to the teachings of the present invention, the analysis module 305 is operable on the organized client data files, and can be instructed with computer-executable instructions, e.g. from the remote client, to perform analyses on the various market sales volume components which are included in the composition of a particular client file.

According to the teachings of the present invention, the software means 303 operable on the server 301 and the client program at the remote client 312 provides for instructing the analysis module 305 to retrieve specific sales data from remote servers 306-1, 306-2, etc. or from an organized client data file. The software means 303 operable on the server 301 and the client program at the remote client 312 is further operable for instructing the analysis module to perform analyses using the sales data to provide simulations for a new product and/or predicted or continued performance relating to specific components of the client's market sales volume for an existing product. Thus, in one embodiment, the software means 303 of the present invention is operable for providing a remote client 312 more accurate and efficient simulations for new product releases. Additionally, in one embodiment, the software means 303 of the present invention is operable for providing a remote client 312 with a more accurate analysis of the impact of advertising marketing effects for the individual components of the client's market sales volume, e.g. penetration, first repeat and depth of repeat in a particular product class or category.

As mentioned above, the server 301 further includes a filter module 307. The software means 303 operable on the server 301 and the client program at the remote client 312 is further operable on the filter module 307. The filter module 307 and software means 303 are operable for retrieving and/or electronically receiving sales data for a specific remote client 312 from the remote servers 306-1, 306-2, etc., and organizing the same into an organized client data file for that client. Such sales data can be electronically transmitted, such as received on-line over the Internet, or received in any other storage medium, e.g. magnetic disk or CD.

In one embodiment, the software means 303, e.g. the analysis module 305, is operable for performing a market penetration analysis. That is, the analysis module receives sales data from the third party organization relating to a first time purchase of a particular client product over a number of sales weeks from the product launch, as well as data representing marketing weeks for the product. As used in this application, marketing weeks can include weeks in which the client manufacturers ran advertising, offered coupon drops or the product was subject to a temporary price reduction (TPR), etc.

In one embodiment, the software means 303 operable on system 300 is further operable on the server 301, the client program at the remote client 312, and the additional servers and systems, e.g. 306-1, 306-2, etc., for comparing predicted results provided by the analysis method of the present invention for a particular client file in server 301 against those of a third party's or outside organization's analyses, and/or those third party's or outside organization's formulations for new marketing strategies.

According to the teachings of the present invention, the invention includes a computer readable medium, e.g. memory 22 and/or storage device 304, having computer executable instructions to cause a computer, e.g. remote client 312, server 301, and additional servers and systems 306-1, 306-2, . . . , 306-N, to perform methods which include accessing online a server database, e.g. storage device 304, which has a number of client files. Each client file is an organized system data file, e.g. a customizable, organized client file including product sales information, which is downloadable and displayable to a client program at the remote client 312 and can be operated upon by the analysis module 305. Each client file can contain a number of organized system data files for a given client. The methods include inputting data into the client program at the remote client 312 for use by the analysis module 305 in performing an analysis on a portion or portions of a particular client file. The methods further include using the analysis module 305 for a simulation using the client's organized system data file, and offering projected evaluations on components of the client's market sales volume for a new product release in any specific future week or point in time.

In one embodiment, by way of example and not by way of limitation, the computer readable medium, e.g. memory 22 and/or storage device 304, having computer executable instructions includes instruction for causing a computer, e.g. remote client 312, server 301, and additional servers and systems 306-1, 306-2, . . . , 306-N, to perform methods of maintaining a server database which has a number of client files. As described above, each client file is an organized system data file, e.g. a customizable, organized client file including client data, which is downloadable and displayable to a client program at a remote client 312.

The methods include using the filter module 307 and the analysis module 305 for setting up a base case using the organized system data file. The methods further include using the analysis module 305 for inputting data using the software means, retrieving data (for example retrieving sales data on a new and existing products/product lines and entering the same into a client's organized data file), retrieving a slope term, and instructing the software means 303 to input a predetermined value for the degree of belly term (B) based on the particular component of a client's sales volume that is being analyzed for use by the analysis module 305 on a particular client file. For example, if a remote client 312 wants to use the software means to analyze the market penetration component the remote client 312 will provide the analysis module 305 with instructions to enter a value of (x) for the degree of belly term (B) which is appropriate for that component and product class. The same applies for the other components of market sales volume. The software means 303 is further operable for taking a performed analysis on a client's data file and implementing these changes as a permanent file, such as an additional/subsequent file or a replacement file, into the organized system data file or files of a particular client.

According to the teachings of the present invention, the invention includes a system 300 which includes a server 301 coupled to the Internet, a website 310 stored on the server 310, and software means 303 operative on the website 310. According to the invention, the software means 303 allows a user running a client program at a remote client 312 coupled to the Internet to electronically perform analyses on an organized client data file containing information or sales data, e.g. panel data on a particular product for that client, in order to study the impact of marketing conducted on the product or run simulations for a new product. The software means 303 receives the data file from a third party organization and performs a number of analyses on the data file. The remote client 312 can access the website to download and display the analyses performed by the software means 303 on the data file. According to the teachings of the present invention, software means 303 performs a number of analyses on the organized client data file using the formula:

$$\text{Predicted} = \text{Exp}(S) \times W^B.$$

Methods According to the Present Invention

Household panel data, which is more widely available, is used instead of the single-source data as discussed in the prior art works of John Philip Jones. According to the teachings of the present invention, by isolating the individual components of market sales volume and examining weekly increments against an expectation of off-air weeks, consistent evidence of advertising effects has been found. Also, according to the teachings of the present invention, simulations for predicted new product performance can be analyzed.

The system explained in connection with FIGS. 1, 2, and 3, comprises a processor, a storage device coupled to the processor, and software means operative on the processor, e.g. system collectively, for providing advertising modeling/analysis and simulating expected new product release performance. The system can perform a method of projecting components of market sales volume for a product at a predetermined number of weeks since product launch, based on a history of sales from product launch. The system can further perform methods for simulating expected sales performance for the different market sales volume components for a new product release. The methods include generating a curve from weekly sales data. Generating a curve includes generating a curve which plots a set of weekly sales data versus a number of weeks from the launch of the product. The method includes retrieving a component (B) of a curve representing an appropriate degree of belly for the curve for a particular product class and a particular component of market sales volume to be analyzed. The method further includes retrieving a component from the curve representing the slope term S. The method further includes performing a calculation to produce or provide a predicted or continued value of a component of market sales volume using the retrieved components, B and S, in the formula:

$$\text{Predicted} = \text{Exp}(S) \times W^B.$$

As explained in connection with FIGS. 1, 2, and 3, the present invention is implemented using computer based systems which have computer readable medium for executing instructions from software means, e.g. programs, for carrying out the methods of the present invention using such systems. These methods include facilitating modeling and forecasting predicted continued performance for any number of components which make up a product sales volume for any number of client organizations, e.g. product manufacturers. The scope of the present invention includes other method embodiments which will be understood by one of ordinary skill in the art upon reading this disclosure.

According to the teachings of the present invention, one method embodiment includes generating a curve from weekly sales data wherein the curve plots a set of weekly sales data versus the number of weeks since the launch of the product. The method further includes retrieving a component of the curve (B) representing a degree of belly of the curve and retrieving a component of the curve representing the slope term (S). It should be apparent to one skilled in the art that the retrieval of these components need not be performed in any particular order, i.e. retrieval of the component representing the slope term may precede the retrieval of component B. The method also includes performing a calculation for a predicted or continued market sales volume component using the B component and the slope component (S) in a formula where the formula is:

$$\text{Predicted} = \text{Exp}(S) \times W^B.$$

The same equation is used for estimating all three components of market sales volume, e.g. market penetration, first repeat and depth of repeat.

The equation contains only three parameters. The first is the slope term (s), which is the only parameter which must be solved from the data. The second term, W, is an objective count of the number of weeks elapsed since the start of the data string. The third term is the degree of belly in the curve (B), which modifies W to a specific power. This modifier, B, is usually treated as a constant, different for each component of market sales volume and/or product class, according to the teachings of the present invention. Also, according to the teachings of the present invention, the component B has a tendency to be constant for each brand or class of products to be analyzed. The absolute number of cases which deviate from this constant are very small, and the deviations are systematic with variations in occasions per repeater per year.

By far the largest number of brands fall within a small range of occasions per repeater per year, between 3.5 and 4.5, allowing these three constants to be used in the vast majority of cases. If a case falls outside the normal range of occasions per repeater per year, it is a simple matter to derive the B term from data for a period previous to that to be analyzed, verify that result for 1–2 other brands in the same category, and then use that specific term for that brand/product class.

"Predicted" is the conditionally expected value for any given week, based on the "condition" of the specific weeks used in solving for S—"normal" weeks, promotion weeks, advertised weeks, off-air weeks, etc. One of ordinary skill in the art will understand upon reading this disclosure that separate curve can be generated to isolate only the promotion weeks or advertised weeks using only data from those weeks. The same software means and methods are employed and the invention is not so limited to producing predicted values for non promotional or non advertising weeks.

A longitudinal stream of data such as purchase panel data is required for the system and method of the present invention. Purchase panel data is available in about 85% of countries of the world, representing a household by household record of purchasing over time.

Only five to six companies produce panel data. AC Nielsen, Inc., and Information Resources, Inc. (IRI) are the two largest suppliers of panel data. AC Nielsen acquires data through 55,000–60,000 households which use a scanner on their purchases. IRI measures data through the purchaser's credit card at the time of purchase. The present method uses panel data. As discussed hereinabove, aggregate sales figures are used by other systems and methods. Aggregate sales figures are not as effective for performing accurate analysis of marketing effects on the individual components of market sales volumes.

Partitioning the data into three levels is the starting point of modeling according to the present invention, but this can be done by the filter module 307. It will be understood by one skilled in the art that in order for the modeling process of the present invention, it is most desirable to obtain sales data from approximately six to eight weeks. Thus, in one exemplary embodiment, it is necessary to know the first time purchase, second time purchase and third through sixth events. These represent penetration, first repeat and depth of repeat, respectively. Frequent shopper panels, or customer loyalty program data has been found to be better data than aggregate sales figures, which are used in previous methods.

In the present method, the panel data is plotted week by week. The shape of the curve is determined by the replacement cycle of the product(s). When there is a short replacement cycle, the front portion of a curve plotted from weekly sales panel data is nearly vertical, showing linear growth. An example of a product with a short replacement cycle is canned cat food, for of there may be fifteen purchases in about twenty six weeks.

The systems and methods of the present invention work particularly well for frequently purchased branded nondurable goods, i.e. consumer packaged goods advertised through mass merchandising. The systems and methods of the present invention also work with panty hose and stockings.

It is worth noting that esoteric products traditionally have a low product penetration percentage. However, such esoteric products, including such over the counter drugs as eye drops, headache remedies, hair dyes, and the like, can be modeled using the systems and methods of the present invention even though these products have a longer end of replacement cycles. Another example of such products are over the counter antidiarrheal, which are purchased perhaps once a year.

In addition, phone ordered pizza delivery is suited for application of the present system and method. The order history provides a purchase panel from which panel data for use is obtained. In addition, eworld, a now defunct on-line service which Apple Computer introduced to compete with AOL, had a growth rate in its first six months which fit the system and method of the present invention.

In general, the systems and methods work well with products which have a replacement cycle shorter than that for wearing apparel, appliances, automobiles, refrigerators, electronics equipment, etc., which have a longer replacement cycle.

In one embodiment, the method is directed to projecting market penetration. This method embodiment includes generating a curve from weekly sales data of initial purchases since the launch of a product, wherein the curve plots the weekly sales data versus the number of weeks since the launch of the product. The method further includes retrieving a component of the curve (B) representing a degree of belly of the curve and retrieving a component of the curve representing the slope term (S). It should be apparent to one skilled in the art that the retrieval of these components need not be performed in any particular order, i.e. retrieval of the component representing the slope term may precede the retrieval of component B. The method also includes performing a calculation for a predicted or continued market penetration using the B component and the slope component (S) in the formula:

$$\text{Predicted} = \text{Exp}\ (S) \times W^B.$$

A graph showing results of this method embodiment for a particular product class is provided in FIG. 5.

Another embodiment of the present invention includes projecting market first repeat. This method embodiment includes generating a curve from weekly sales data of second purchases, i.e. first repeat purchases, since the launch of a product, wherein the curve plots the weekly sales data versus the number of weeks since the launch of the product. The method further includes retrieving a component of the curve (B) representing a degree of belly of the curve and retrieving a component of the curve representing the slope term (S). It should be apparent to one skilled in the art that the retrieval of these components need not be performed in any particular order, i.e. retrieval of the component representing the slope term (S) may precede the retrieval of component B. The method also includes performing a calculation for a predicted or continued market first repeat using the B component and the slope component (S) in the formula:

$$\text{Predicted} = \text{Exp}\ (S) \times W^B.$$

Figure 6:
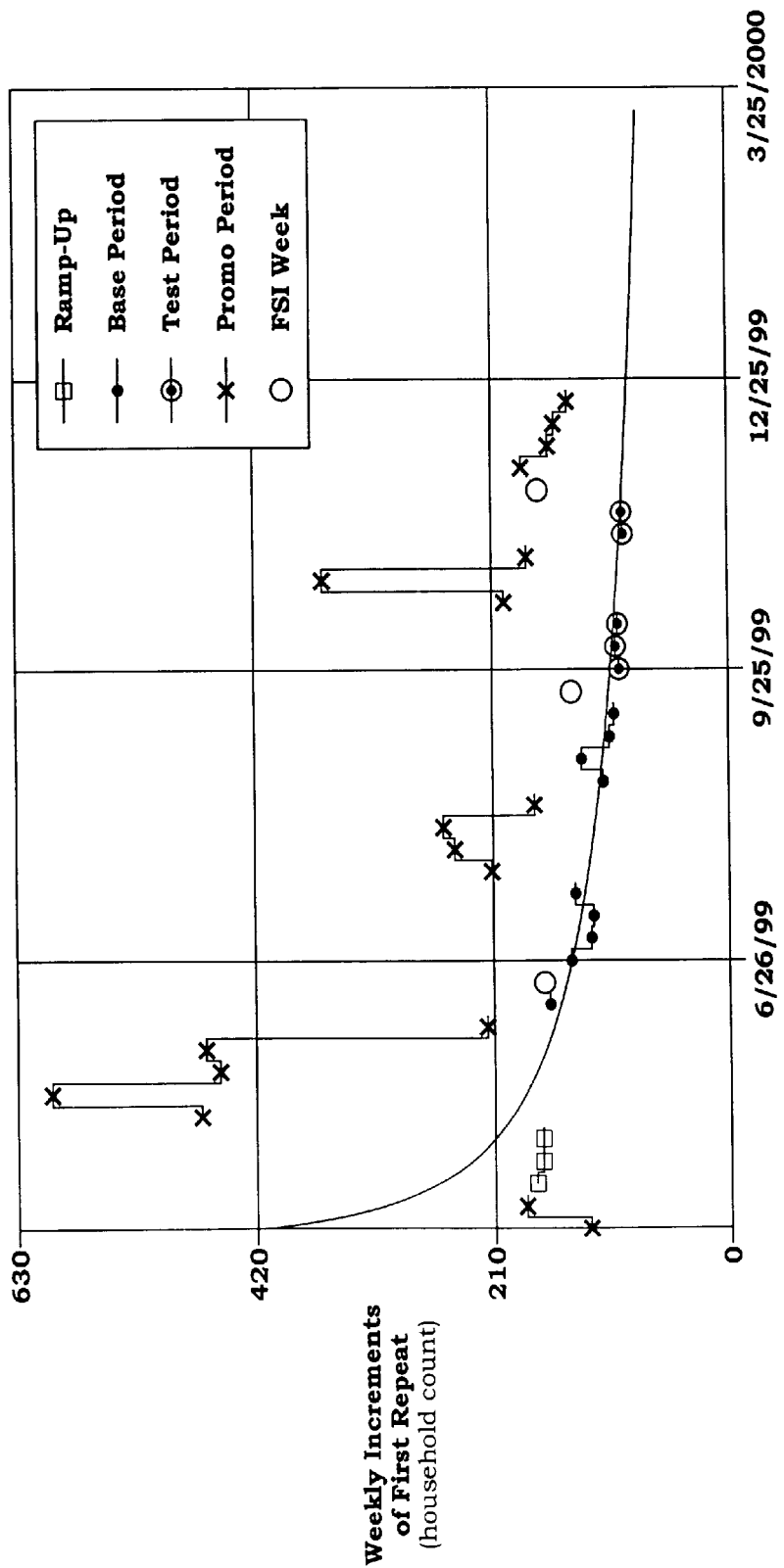
FIG. 6 is a curve representing predicted and projected first repeat according to one embodiment of the present invention.

A graph showing results of this method embodiment for a particular product class is provided in FIG. 6.

Another embodiment of the present invention includes projecting market depth of repeat. This method includes generating a curve from weekly sales data of Nth purchases, where $N \geq 3$, i.e. depth of repeat purchases, since the launch of a product, wherein the curve plots the weekly sales data versus the number of weeks since the launch of the product. The method further includes retrieving a component of the curve (B) representing a degree of belly of the curve and retrieving a component of the curve representing the slope term (S). It should be apparent to one skilled in the art that the retrieval of these components need not be performed in any particular order, i.e. retrieval of the component representing the slope term (S) may precede the retrieval of component B. The method also includes performing a calculation for a predicted or continued market depth of repeat using the B component and the slope component (S) in the formula:

$$\text{Predicted} = \text{Exp}(S) \times W^B.$$

A graph showing results of this method embodiment for a particular product class is provided in FIG. 7.

One method embodiment incorporates the software means having computer executable instructions described above. The software means are employed by a user at the user's own computer or at a remote client for accessing on-line a server database which has a number of client files. The method includes receiving sales data in the form of panel data and collecting the same in an organized client data file. The method includes using software means to perform the method embodiments described above. In one embodiment, accessing on-line a server database includes accessing on-line the server database over a secure data network. Each client file is an organized system data file, e.g. a customizable, organized data file including panel data of sales, as described earlier, which is downloadable and displayable to a client program at the remote client.

One method embodiment of the present invention includes maintaining a server database. Maintaining the server database includes maintaining a number of client data files which are organized system data files. The method includes accessing the server database online from a remote client. The method includes entering a value for a number of weeks W at which a market sales volume component, e.g. market penetration, first repeat or depth of repeat) is to be projected. The method includes on-line simulation of the market sales volume components using the organized system data file, and the W value according to the formula:

$$\text{Predicted} = \text{Exp}(S) \times W^B.$$

The method includes displaying the report of sales or results of a simulation on a graphical user interface at the remote client.

The method described herein incorporate the software means having computer executable instructions described above for electronically transmitting and/or receiving on-line a data file from a user in a non-aggregate format, as described herein. The methods of the present invention include filtering the data file. The methods of the present invention further include organizing the data file into an organized system data file from the non-aggregate format from any number of different user platforms.

Another method embodiment of the present invention incorporates the software means having computer executable instructions described above. The software means are employed for maintaining a database which has a number of client files which are organized system data files. As stated above, each client file is an organized system data file, e.g. a customizable, organized data file including products and panel data which is downloadable and displayable to a client program at the remote client. The method includes accessing the server database. The software means can be used to particularly isolate a given component of sales volume performance a fixed number of weeks out by using a curve which plots sales data versus a number of weeks of sales from a product launch as described in detail above. This method includes specifying the week (W) for which the predicted component should be displayed. Also, the methods of the present invention include displaying, using the number of web pages, specific component of market sales volume over a number of future weeks. In this manner, the present invention affords a remote client with the ability to more precisely analyze the effects of marketing on the sales volume components of its product sales. According to the methods of the present invention, a value for a number of weeks W at which market sales volume component, e.g. market penetration, first repeat or depth of repeat, is to be projected is entered into the system of the present invention. Market penetration analysis, or analysis of any of the other market sales volume components, is simulated using the organized system data file, and the W value according to the formula:

$$\text{Predicted} = \text{Exp}(S) \times W^B.$$

The methods of the present invention include displaying the report of sales or results of a simulation on a graphical user interface.

A modified version of the formula above, based on a long term stream of data is:

$$V_{1-3} = S \times W^B + I$$

The value (I) accounts for break points which are built into data provided subsequent to the first data set provided. This makes it possible, for example, to determine for a projected penetration value the slope term (S) needed to get to that value. In the equation, $V_1$ represents the market penetration component of market sales volume, e.g. a one time sale. $V_2$ represents first repeat. $V_3$ represents depth of repeat, which has an infinite number of sales events.

According to one embodiment of the present invention, where the equation corresponds to the use of cumulative data and the systems and methods are being used to produce a predicted market penetration, the value of B=0.5. According to one embodiment of the present invention, where the equation corresponds to the use of cumulative data and the systems and methods are being used to produce a predicted first repeat, the value of B=0.6. According to one embodiment of the present invention, where the equation corresponds to the use of cumulative data and the systems and methods are being used to produce a predicted depth of repeat (representing sales events up to about six), the value of B=1.48. According to one embodiment of the present invention, where the equation corresponds to the use of decumed data, the value of B for market penetration is B=−0.525, for first repeat B=−0.420, and for depth of repeat B=+0.490.

FIGS. 5–7 are represent the curves generated by the systems and method of the present invention for predicting components of market sales volume. FIGS. 5–7 are charts for a human food product (as opposed to pet foods) bought on roughly four purchase occasions per repeater per year.

The data used in the exemplary embodiments of FIGS. 5–7 were obtained from PDI, a shopper loyalty club supplier. The data covers two cities and one chain. The panel included over 166,000 households. The "normal" state data has been modeled, i.e., the data has been classified into weeks with promotional activity (as defined by a third party source), weeks with Sunday supplement coupons, e.g. Free Standing Inserts (FSI) weeks, and weeks with no promotional or coupon activity (the "normal" state for the brand).

The "normal" weeks were arbitrarily divided into a base period and a test period, even though there was no test present. Only the base period weeks were used to fit the equations in producing the curves shown in FIGS. 5–7. As explained above, however, the invention is not so limited, and other type period weeks can similarly be analyzed using the systems and methods of the present invention. By comparing the expected value from the base period with the actual values from the fictional test period, it is apparent to one skilled in the art how the model could be used to test the effect of any variable, or the effects of the promotional weeks which were held out from the modeling.

The curves shown in FIGS. 5–7 show the individual weeks of each classification, the fit line derived from the base period data (the expected value for each week if it were non-coupon/non-promotional week), and the equation derived from the "normal" week's data. Again, as explained above, however, the invention is not so limited, and other type period weeks can similarly be analyzed using the systems and methods of the present invention.

The only modeled component on the charts is the fit line produced by the system and method of the present invention. All the rest is raw, unadjusted data as it comes from the data supplier.

All of the stores providing data were from one chain, and the practice of that chain was to promote by offering temporary price reductions (TPR). Contrasting FIG. 4, a chart titled IN STORE CONDITIONS is shown. The chart of FIG. 4 only shows an objective measure of the level of temporary price reduction (TPR) activity, measured in percent % of All Commodity Volume, a measure which weights large and small stores by the volume of all goods sold. Weeks designated by a bullseye were counted as promotion weeks (Promo Period). Weeks designated by a bullet were counted as non-promotional weeks. This is not as effective an analysis technique as the systems and methods of the present invention.

Referring to FIG. 5, a graph titled PENETRATION BUYING OCCASIONS is shown, which shows weekly increments of penetration. Weeks designated by a bullet correspond to the base period. Weeks designated by a bullseye correspond to the test period. Weeks designated by X correspond to the promotional period. Weeks designated by a circle correspond to a FSI week.

The formula, according to the systems and methods of the present invention, used in FIG. 5 is:

$$\text{Predicted}=\text{Exp }(6.995)\times W^{-0.525}.$$

Referring to FIG. 6, a graph titled FIRST REPEAT BUYING OCCASIONS is shown, which shows weekly increments of first repeat. Weeks designated by a square correspond to the ramping up period. Weeks designated by a bullet correspond to the base period. Weeks designated by a bullseye correspond to the test period. Weeks designated by X correspond to the promotional period. Weeks designated by a circle correspond to a FSI week.

The formula, according to the systems and methods of the present invention, used in FIG. 6 is:

$$\text{Predicted}=\text{Exp }(6.021)\times W^{-0.4200}.$$

Referring to FIG. 7, a graph titled DEPTH OF REPEAT BUYING OCCASIONS is shown, which shows weekly increments of depth of repeat activity. Weeks designated by a square correspond to the ramping up period. Weeks designated by a bullet correspond to the base period. Weeks designated by a bullseye correspond to the test period. Weeks designated by X correspond to the promotional period. Weeks designated by a circle correspond to a FSI week.

The formula, according to the systems and methods of the present invention, used in FIG. 7 is:

$$\text{Predicted}=\text{Exp }(4.233)\times W^{-0.4935}.$$

Conclusion

Thus the accuracy and effectiveness of the systems and methods of the present invention has been demonstrated. Systems and methods have been described which afford organizations greater flexibility and accuracy in analyzing effects of their current advertising and better forecasting and implementation of proposed strategies and advertising changes. These systems and methods include a modeling process which can be used to isolate and document marketing and advertising effects of any kind, including effects of a short-term or long-term nature. The process may also be used to monitor or forecast advertising effects. In addition, the process may be used to simulate a test market for a product. According to the teachings of the present invention, the modeling process uses household panel data. The present invention provides a method for predicting expected sales volume. The three components of sales volume, penetration, first repeat and depth of repeat are predicted according to the present invention based on data such as consumer response data from a simulated test market. According to the teachings of the present invention, these factors are predicted and/or simulated according to the following formula:

$$\text{Predicted}=\text{Exp }(S)\times W^B.$$

The same equation is used for estimating all three components of volume, e.g. penetration (the initial purchase), first repeat (the second purchase) and depth of repeat (the third or higher purchase).

What is claimed is:

1. A system for facilitating modeling of market sales volume comprising:

a server including a database having a number of client files, wherein each client file is an organized client data file including a number of linked web pages which are downloadable and displayable to a client program at a remote client having a graphical user interface;

an input device coupled to the remote client and on-line to the server;

at least one web page including a data field for entering a parameter for an analysis of a client file; and software means operable on the server and the client program at the remote client for projecting penetration of products or merchandise at a predetermined number of weeks, W, since a launch of a product, based on weekly data of initial purchases from a launch of a product according to a method, the method comprising:

generating a curve from weekly sales data wherein the curve plots a set of weekly sales data versus number of weeks from the launch of the product;

retrieving a component of the curve (B) representing a degree of belly of the curve;

retrieving a component from the curve representing a slope (S); and performing a calculation to produce a predicted or continued market penetration value using the B component and the slope component in a formula, wherein the formula is:

$$\text{Predicted}=\text{Exp}(S)\times W^{(B)}.$$

2. The system of claim 1, wherein at least one web page includes an input file comprising a listing of input sales data for a client file and wherein the software means operable on the server and the client program at the remote client is further operable for modifying the input file in order to add additional sales data.

3. The system of claim 1, wherein the software means operable on the server and the client program is further operable for entering a set of data for a product into a client file.

4. The system of claim 1, wherein at least one web page includes a historical performance analysis for a client file and wherein the software means operable on the server and the client program at the remote client is further operable for entering a number of analysis variables into the historical performance analysis.

5. The system of claim 1, wherein at least one web page includes a page for displaying the curve generated by the software means and-wherein the software means operable on the server and the client program at the remote client is further operable for entering a number of analysis variables into the curve prior to its generation.

6. The system of claim 1, wherein the system further includes a filter which organizes an electronically transmitted data file received on-line from a user in non-aggregate format into the organized client data file for storage in the database of the server.

7. The system of claim 6 wherein the electronically transmitted data file includes a set of weekly sales data and data representing a number of weeks since a launch of a product.

8. The system of claim 6 wherein the software means is further operable on the filter and uses codes in the electronically transmitted data file transmitted from any number of different user platforms to organize the electronically transmitted data file into the organized client data file.

9. The system of claim 8, wherein the software means operable on the server and the client program is further operable for providing on-line system support.

10. A system for facilitating modeling of market sales volume comprising:
- a server, wherein the server includes a database having a number of client files, wherein each client file is an organized client data file including a number of linked web pages which are downloadable and displayable to a client program at a remote client having a graphical user interface;
- an input device coupled to the remote client and on-line to the server;
- at least one web page including a data field for entering a parameter for an analysis of a client file; and
- software means operable on the server and the client program at the remote client for projecting first repeat of merchandise at a predetermined number of weeks, W, since a launch of a product, based on weekly data of second purchases from a launch of a product according to a method, the method comprising:
  - generating a curve from weekly sales data wherein the curve plots a set of weekly sales data versus number of weeks from the launch of the product;
  - retrieving a component of the curve (B) representing a degree of belly of the curve;
  - retrieving a component from the curve representing a slope (S); and
  - performing a calculation to produce a predicted or continued market first repeat value using the B component and the slope component in a formula, wherein the formula is:

$$\text{Predicted}=\text{Exp}(S) \times W^{(B)}.$$

11. The system of claim 10, wherein at least one web page includes an input file comprising a listing of input sales data for a client file and wherein the software means operable on the server and the client program at the remote client is further operable for modifying the input file in order to add additional sales data.

12. The system of claim 10, wherein the software means operable on the server and the client program is further operable for entering a set of data for a product into a client file.

13. The system of claim 10, wherein at least one web page includes a historical performance analysis for a client file and wherein the software means operable on the server and the client program at the remote client is further operable for entering a number of analysis variables into the historical performance analysis.

14. The system of claim 10, wherein at least one web page includes a page for displaying the curve generated by the software means and wherein the software means operable on the server and the client program at the remote client is further operable for entering a number of analysis variables into the curve prior to its generation.

15. The system of claim 10, wherein the system further includes a filter which organizes an electronically transmitted data file received on-line from a user in non-aggregate format into the organized client data file for storage in the database of the server.

16. The system of claim 15 wherein the electronically transmitted data file includes a set of weekly sales data and data representing a number of weeks since a launch of a product.

17. The system of claim 15 wherein the software means is further operable on the filter and uses codes in the electronically transmitted data file transmitted from any number of different user platforms to organize the electronically transmitted data file into the organized client data file.

18. The system of claim 17, wherein the software means operable on the server and the client program is further operable for providing on-line system support.

19. A system for facilitating modeling of market sales volume comprising:
- a server, wherein the server includes a database having a number of client files, wherein each client file is an organized client data file including a number of linked web pages which are downloadable and displayable to a client program at a remote client having a graphical user interface;
- an input device coupled to the remote client and on-line to the server;
- at least one web page including a data field for entering a parameter for an analysis of a client file; and
- software means operable on the server and the client program at the remote client for projecting depth of repeat of merchandise at a predetermined number of weeks, W, since a launch of a product, based on weekly data of Nth purchases from a launch of a product, where $N \geq 3$, wherein the software means performs a method, the method comprising:
  - generating a curve from weekly sales data wherein the curve plots a set of weekly sales data versus number of weeks from the launch of the product;
  - retrieving a component of the curve (B) representing a degree of belly of the curve;
  - retrieving a component from the curve representing a slope (S); and
  - performing a calculation to produce a predicted or continued market depth of repeat value using the B component and the slope component in a formula, wherein the formula is:

Predicted=Exp($S$)×$W^{(B)}$.

20. The system of claim 19 wherein at least one web page includes an input file comprising a listing of input sales data for a client file and wherein the software means operable on the server and the client program at the remote client is further operable for modifying the input file in order to add additional sales data.

21. The system of claim 19, wherein the software means operable on the server and the client program is further operable for entering a set of data for a product into a client file.

22. The system of claim 19, wherein at least one web page includes a historical performance analysis for a client file and wherein the software means operable on the server and the client program at the remote client is further operable for entering a number of analysis variables into the historical performance analysis.

23. The system of claim 19, wherein at least one web page includes a page for displaying the curve generated by the software means and wherein the software means operable on the server and the client program at the remote client is further operable for entering a number of analysis variables into the curve prior to its generation.

24. The system of claim 19, wherein the system further includes a filter which organizes an electronically transmitted data file received on-line from a user in non-aggregate format into the organized client data file for storage in the database of the server.

25. The system of claim 24 wherein the electronically transmitted data file includes a set of weekly sales data and data representing a number of weeks since a launch of a product.

26. The system of claim 24 wherein the software means is further operable on the filter and uses codes in the electronically transmitted data file transmitted from any number of different user platforms to organize the electronically transmitted data file into the organized client data file.

27. The system of claim 26, wherein the software means operable on the server and the client program is further operable for providing on-line system support.

28. A computer readable medium having computer executable instructions to cause a computer to perform a method for projecting market penetration of merchandise at a predetermined number of weeks, W, since a launch of a product, based on a set of weekly sales data from the product launch, the method comprising:

generating a curve from weekly sales data wherein the curve plots a set of weekly sales data versus number of weeks from the launch of the product;

retrieving a component of the curve (B) representing a degree of belly of the curve;

retrieving a component from the curve representing a slope (S); and performing a calculation for a predicted or continued market penetration using the B component and the slope component in a formula, wherein the formula is:

Predicted=Exp($S$)×$W^{(B)}$.

29. The computer readable medium of claim 28, wherein the method further includes simulating a value for market penetration for a predetermined number of weeks since product launch.

30. The computer readable medium of claim 28, wherein the method further includes simulating a value for first repeat at a predetermined number of weeks since product launch.

31. The computer readable medium of claim 28, wherein the method further includes simulating a value for depth of repeat at a predetermined number of weeks since product launch.

32. The computer readable medium of claim 28, wherein the method further comprises entering a set of data for a product into a client file.

33. The computer readable medium of claim 28, wherein the method further comprises generating a historical performance analysis for a product in a client file and entering a number of analysis variables into the historical performance analysis.

34. The computer readable medium of claim 28 wherein the method further comprises displaying the curve on a graphical user interface at a remote client.

35. The computer readable medium of claim 34 wherein the method further comprises entering a number of analysis variables into a client file prior to generating the curve.

36. A computer method for projecting market penetration of merchandise at a predetermined number of weeks, W, since a launch of a product, based on a set of weekly sales data from the product launch, the method comprising:

using a set of computer executable instructions to generate a curve from weekly sales data wherein the curve plots a set of weekly sales data versus number of weeks from the launch of a product;

using a set of computer executable instructions to retrieve a component of the curve (B) representing a degree of belly of the curve;

using a set of computer executable instructions to retrieve a component from the curve representing a slope (S); and using a set of computer executable instructions to perform a calculation to produce a predicted or continued market sales volume component using the B component and he slop component in a formula, wherein the formula is:

Predicted=Exp($s$)×$W^B$.

37. The method of claim 36, wherein the set of weekly sales data comprises weekly data of initial purchases from the launch of the product, and wherein the method further comprises simulating a value for market penetration for a predetermined number of weeks since product launch.

38. The method of claim 36, wherein the set of weekly sales data comprises weekly data of second purchases from the launch of the product, and wherein the method further comprises simulating a value for first repeat at a predetermined number of weeks since product launch.

39. The method of claim 36, wherein the set of weekly sales data comprises weekly data of Nth purchases from the launch of the product, where N≧3, and the method further comprises simulating a value for depth of repeat at a predetermined number of weeks since product launch.

40. The method of claim 36 wherein generating the curve further comprises:

accessing a client file in the server database on-line from a remote client, wherein the server database has a number of client files including history of sales of a product from product launch, and which are downloadable and displayable to a client program at the remote client;

inputting a value for a number of weeks at which market penetration is to be projected; and simulating on-line a market penetration analysis using the organized system data file and the W value.

41. The method of claim 40, wherein accessing a server database on-line includes accessing the server database on-line over a secure data network.

42. The method of claim 40, further comprising simulating a value for market penetration for a predetermined number of weeks since product launch.

43. The method of claim 40 further comprising simulating a value for first repeat at a predetermined number of weeks since product launch.

44. The method of claim 40 further comprising simulating a value for depth of repeat at a predetermined number of weeks since product launch.

45. The method of claim 36 further comprising:

electronically transmitting a data file on-line from a remote client to the server in a non-aggregate format from any number of different user platforms;

filtering the data file at the server; and wherein filtering the data file includes organizing the data file into an organized, customizable client file.

46. The method of claim 45, wherein the method further includes providing on-line server database support.

* * * * *